United States Patent Office 2,882,768
Patented Apr. 21, 1959

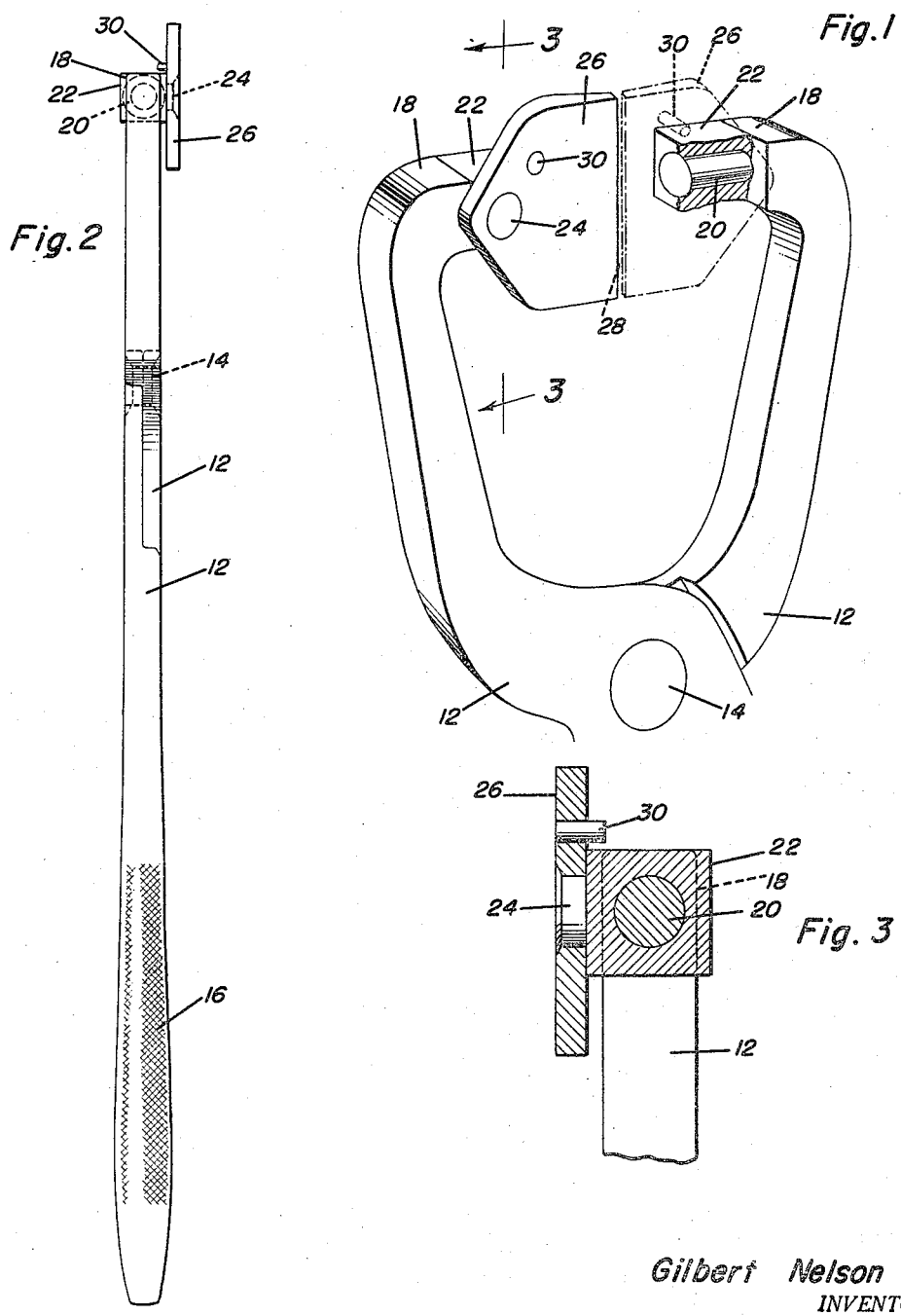

2,882,768
DUCT JOINING TOOL

Gilbert Nelson, Little Rock, Ark.

Substituted for abandoned application Serial No. 371,804, August 3, 1953. This application May 1, 1958, Serial No. 733,786

4 Claims. (Cl. 81—5.1)

This invention relates to new and useful improvements and structural refinements in tools for joining sheet metal ducts, or the like, and the principal object of the invention is to provide a tool of the character herein described, which may be conveniently and effectively employed for drawing end portions of such ducts together, prior to their permanent fastening.

Some of the advantages of the invention reside in its simplicity of construction, in its efficient and dependable operation, and in its adaptability to economical manufacture.

With the above more important objects and features in view and such other objects and features as may become apparent as this specification proceeds, the invention resides in the details of construction and operation as more fully hereinafter described and claimed, reference being had to the accompanying drawings forming a part hereof, in which:

Figure 1 is a fragmentary perspective view of the invention;

Figure 2 is an end view thereof; and

Figure 3 is a fragmentary sectional detail, on an enlarged scale, taken substantially in the plane of the line 3—3 in Figure 1.

Like characters of reference are employed to designate like parts in the specification and throughout the several views.

Referring now to the accompanying drawings in detail, the duct joining tool is designated generally by the reference character 10 and embodies in its construction a pair of arms 12 which are pivotally connected together intermediate the ends thereof by a pivot pin 14 and afford a pair of coacting handles 16 at one end thereof, as will be clearly apparent.

The arms 12 terminate at their other end in a pair of opposing arm members 18 which, in turn, carry a pair of substantially coaxial pins 20.

A pair of blocks 22 are rotatably positioned on the respective pins 20 and carry a pair of fulcrum pins 24 the axes of the latter being disposed at right angles to the axes of the pins 20.

A pair of work engaging jaws 26 are rotatably mounted on the fulcrum pins 24, the jaws 26 having work engaging edges 28 disposed in opposing relation, as is clearly shown in Figure 1.

In order to limit the extent of rotation of the jaws 26 on the fulcrum pins 24, stop pins 30 are provided on the jaws and are engageable with the respective blocks 22. In this manner, the jaws 26 are permitted to move sufficiently so that the work engaging edges 28 thereof are substantially in opposing relation, nevertheless, excessive swinging movement of the jaws is prevented.

When the invention is placed in use, the arms 12 are spread apart by spreading the handles 16 so that the jaws 26 become separated, whereupon the work engaging edges 28 of the two jaws may be applied to the customary annular or perimetric means provided on the end portions of the ducts which are to be joined. Then, by compressing the handles 16 together, the jaws 26 will exert inward, opposing pressure on the end portions of the ducts, thus firmly and properly drawing the same together, preparatory to permanent fastening.

It is believed that the advantages and use of the invention will be clearly understood from the foregoing disclosure and, accordingly, further description thereof at this time is deemed unnecessary.

What is claimed as new is as follows:

1. A duct joining tool comprising a pair of similar arms disposed in crossed relation, a first pivot pin extending through said arms at their point of crossing and connecting said arms together for relative pivotal movement, said arms including a pair of cooperating handles at one end and a pair of opposing arm members at the other end, a pair of substantially coaxial second pins projecting in opposed relation from said arm members, a block rotatably journalled on each of said second pins, a pair of duct engaging jaws disposed in substantially opposed cooperating relation, individual third pivot pins pivotally mounting said duct engaging jaws on said blocks.

2. A duct joining tool comprising a pair of similar arms disposed in crossed relation, a first pivot pin extending through said arms at their point of crossing and connecting said arms together for relative pivotal movement, said arms including a pair of cooperating handles at one end and a pair of opposing arm members at the other end, a pair of substantially coaxial second pins projecting in opposed relation from said arms members, a block rotatably journalled on each of said second pins, a pair of duct engaging jaws disposed in substantially opposed cooperating relation, individual third pivot pins pivotally mounting said duct engaging jaws on said blocks, said third pins being disposed substantially normal to said second pins.

3. A duct joining tool comprising a pair of similar arms disposed in crossed relation, a first pivot pin extending through said arms at their point of crossing and connecting said arms together for relative pivotal movement, said arms including a pair of cooperating handles at one end and a pair of opposing arm members at the other end, a pair of substantially coaxial second pins projecting in opposed relation from said arm members, a block rotatably journalled on each of said second pins, a pair of duct engaging jaws disposed in substantially opposed cooperating relation, individual third pivot pins pivotally mounting said duct engaging jaws on said blocks, stop means on said duct engaging jaws engageable with respective ones of said blocks for limiting pivoting of said duct engaging jaws relative to said blocks.

4. A duct joining tool comprising a pair of similar arms disposed in crossed relation, a first pivot pin extending through said arms at their point of crossing and connecting said arms together for relative pivotal movement, said arms including a pair of cooperating handles at one end and a pair of opposing arm members at the other end, a pair of substantially coaxial second pins projecting in opposed relation from said arm members, a block rotatably journalled on each of said second pins, a pair of duct engaging jaws disposed in substantially opposed cooperating relation, individual third pivot pins pivotally mounting said duct engaging jaws on said blocks, said third pins being disposed substantially normal to said second pins, stop means on said duct engaging jaws engageable with respective ones of said blocks for limiting pivoting of said duct engaging jaws relative to said blocks.

References Cited in the file of this patent
UNITED STATES PATENTS

| 527,132 | Teel | Oct. 9, 1894 |
| 887,552 | Veno | May 12, 1908 |
| 1,428,679 | Caswell | Sept. 12, 1922 |

FOREIGN PATENTS

| 66,041 | Norway | Mar. 29, 1943 |